(12) United States Patent
Currey

(10) Patent No.: US 9,280,353 B1
(45) Date of Patent: Mar. 8, 2016

(54) CLOUD-BASED AUTOMATIC MAPPING FOR CROSS-PLATFORM DISPLAY

(75) Inventor: Robert W. Currey, Redding, CA (US)

(73) Assignee: HOPTO INC., Campbell, CA (US)

( * ) Notice: Subject to any disclaimer, the term of this patent is extended or adjusted under 35 U.S.C. 154(b) by 343 days.

(21) Appl. No.: 13/475,925

(22) Filed: May 18, 2012

(51) Int. Cl.
*G06F 9/44* (2006.01)
(52) U.S. Cl.
CPC ..................................... *G06F 9/44* (2013.01)
(58) Field of Classification Search
CPC . G06F 3/0481; G06F 3/1454; H04L 12/1813; H04L 67/1095; H04L 67/38
See application file for complete search history.

(56) References Cited

U.S. PATENT DOCUMENTS

| 2006/0002315 | A1 | 1/2006 | Theurer et al. | |
| 2008/0235721 | A1 | 9/2008 | Ismail et al. | |
| 2010/0201657 | A1* | 8/2010 | Miyazaki | 345/205 |
| 2011/0277027 | A1* | 11/2011 | Hayton et al. | 726/8 |
| 2012/0102549 | A1* | 4/2012 | Mazzaferri et al. | 726/4 |

OTHER PUBLICATIONS

U.S. Appl. No. 13/475,923, Robert W. Currey, Automatic Mapping for Cross-Platform Display, May 18, 2012.
U.S. Appl. No. 13/475,924, Robert W. Currey, Automatic Mappinf for Cross-Platform Display, May 18, 2012.
U.S. Appl. No. 13/475,923; Office Action mailed May 6, 2014.
U.S. Appl. No. 13/475,924; Office Action mailed Jun. 16, 2014.
U.S. Appl. No. 13/475,923; Final Office Action mailed Nov. 19, 2014.
U.S. Appl. No. 13/475,924; Final Office Action mailed Feb. 23, 2015.
U.S. Appl. No. 13/475,923; Office Action mailed Apr. 22, 2015.

* cited by examiner

Primary Examiner — Maurice L McDowell, Jr.
Assistant Examiner — Raffi Isanians
(74) Attorney, Agent, or Firm — Lewis Roca Rothgerber Christie LLP

(57) ABSTRACT

Mapping logic information associating a particular type of input with a particular response may be stored in memory. Data including information regarding a display of the host device may be received. Such information may be used to identify multiple descriptions of the host device display. Each description is mapped to a response based on the stored mapping logic. For example, a status bar may be used by the host device to show status updates. The map allows for a different type of response to status updates on the client device, such as a translucent pop-up window. Instructions may be generated for the client device, such that the client device response to input information is based on the mapped description.

9 Claims, 4 Drawing Sheets

CLOUD-BASED AUTOMATIC MAPPING FOR CROSS-PLATFORM DISPLAY

BACKGROUND

1. Field of the Invention

The present invention generally relates to cross-platform display. More specifically, the present invention relates to automatic mapping for cross-platform display.

2. Description of the Related Art

Individuals currently have a variety of options for communicating and carrying out transactions. Such options may include traditional desktop computing devices, as well as various mobile devices (e.g., mobile phones, smartphones, tablets). In fact, many individuals may use multiple computing and mobile devices at home, work, and on the move. For example, an individual may use a desktop computer at work, a laptop computer at home, and one or more mobile devices (e.g., smartphone, tablet) elsewhere. As such, people have come to expect to be able to have access to data and computing resources so to perform most computing tasks anywhere.

One difficulty in meeting such an expectation is that the various computing devices may not all have the same capabilities. For example, such devices may run different operating systems/platforms and applications. Such differences may make it difficult to support the same tasks across such devices. One solution has been to provide remote desktops where a first device runs the applications and a second device receives the visual display that appears on the first device over a communication network (e.g., Internet). Such remote desktops can allow users to access and control resources and data on the first device at a remote location using a second (e.g., portable) device.

One drawback to such an approach arises from the fact that such devices are generally used differently, so applications may be optimized for one type of device, but not another. For example, the different devices may have different sizes and input options (e.g., keyboard, keypad, touchscreen). The display of one device may not be optimized for a second device. For example, if a desktop computer display is shrunk to fit on a smartphone screen, the shrunken size may be difficult for the user to read or discern what is being displayed. Alternatively, if the display is not shrunk, the smartphone may only be able to display a portion of the original display at a time, which also adds to the difficulty in reading and discerning what is being displayed. While some devices allow for manual adjustment of the display by the user, changing displays and images may require the user to continually re-adjust the display, which may be unwieldy and inconvenient. Such is the case in many applications where content only uses a portion of the screen and user interface portions (e.g., toolbars, status bars, scroll bars, rulers).

There is, therefore, a need in the art for improved systems and methods for automatic mapping for cross-platform display.

SUMMARY OF THE CLAIMED INVENTION

Embodiments of the present invention include systems and methods of automatic mapping for cross-platform display. Mapping logic information associating a particular type of input with a particular response may be stored in memory. Data including information regarding a display of the host device may be received. Such information may be used to identify multiple descriptions of the host device display. Each description is mapped to a response based on the stored mapping logic. For example, a status bar may be used by the host device to show status updates. The map allows for a different type of response to status updates on the client device, such as a translucent pop-up window. Instructions may be generated for the client device, such that the client device response to input information is based on the mapped description.

Various embodiments of the present invention include methods of automatic mapping for cross-platform display. Such methods may include storing mapping logic in memory, receiving data including information regarding a display of a host device, executing instructions to map the descriptions of the host device display to a response at the client device, and generate instructions for a display of a client device based on the mapped descriptions. As a result, the client device display may correspond to the host device information based on the mapped descriptions.

Embodiments of the present invention may further include systems of automatic mapping for cross-platform display. Such systems may include a host device and a client device requesting information from a host device. Mapping logic may be stored in memory. The host device may provide data including information regarding a display of the host device. Such information may be used to map the descriptions of the host device display to a response at the client device, and generate instructions for a display of a client device based on the mapped descriptions. Execution of such instructions by the client device may allow the client device to respond based on the mapped description. In some embodiments, an intermediate device (e.g., server) may store the mapping logic, receive the request from the client device, retrieve information from the host device, map descriptions of the host device display to a corresponding response, generate instructions for a display of a client device based on the mapped descriptions, and send the instructions to the client device.

Other embodiments of the present invention include non-transitory computer-readable storage media on which is embodied instructions executable to perform a method of automatic mapping for cross-platform display as previously set forth above.

DETAILED DESCRIPTION

Automatic mapping for cross-platform display is provided. Mapping logic information associating a particular type of input with a particular response may be stored in memory. Data including information regarding a display of the host device may be received. Such information may be used to identify multiple descriptions of the host device display. Each description is mapped to a response based on the stored mapping logic. For example, a status bar may be used by the host device to show status updates. The map allows for a different type of response to status updates on the client device, such as a translucent pop-up window. Instructions may be generated for the client device, such that the client device response to input information is based on the mapped description.

Figure 1:
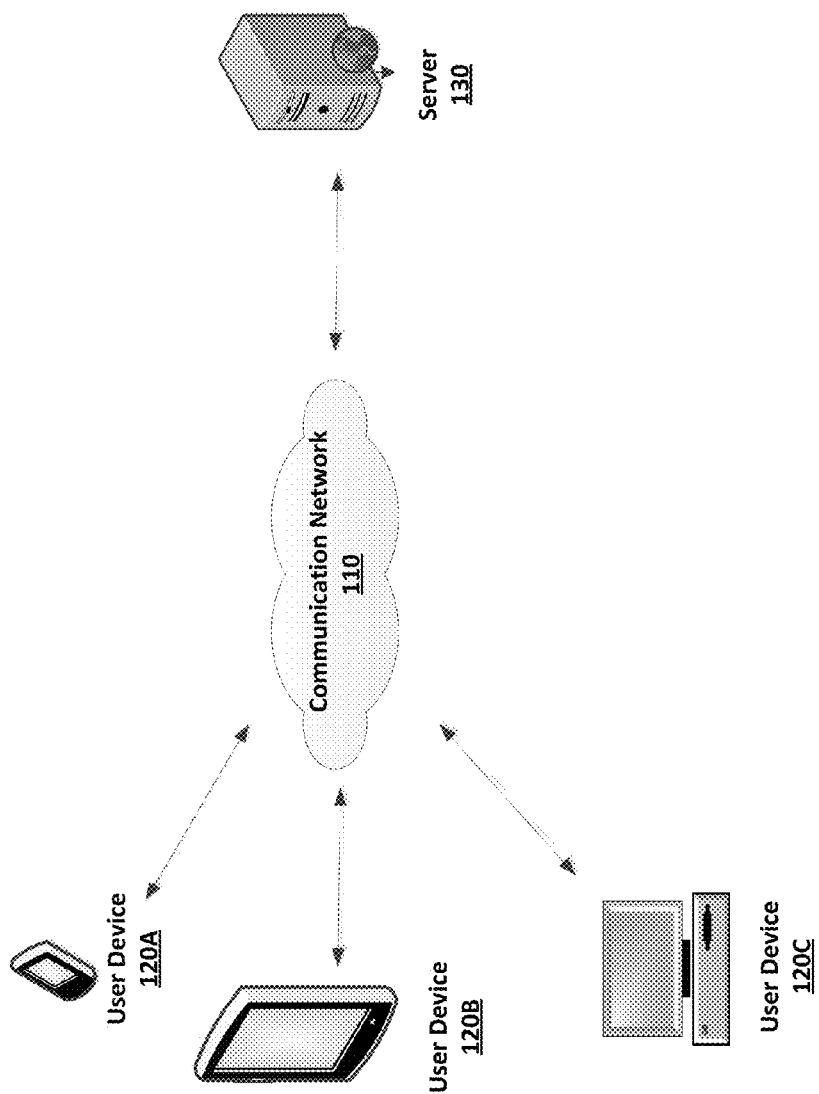
FIG. 1 illustrates a network environment in which an exemplary system of automatic mapping for cross-platform display may be implemented.

FIG. 1 illustrates a network environment 100 in which a system for automatic mapping for cross-platform display may be implemented. Network environment 100 may include a communication network 110, one or more user devices 120A-C, and a server 130. Devices in network environment 100 may communicate with each other via communications network 110.

Communication network 110 may be a local, proprietary network (e.g., an intranet) and/or may be a part of a larger wide-area network (e.g., the cloud). The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 allows for communication between the various components of network environment 100.

Users may use any number of different electronic user devices 120A-C, such as general purpose computers, mobile phones, smartphones, personal digital assistants (PDAs), portable computing devices (e.g., laptop, netbook, tablets), desktop computing devices, handheld computing devices, or any other type of computing device capable of communicating over communication network 110. User devices 120 may also be configured to access data from other storage media, such as memory cards or disk drives as may be appropriate in the case of downloaded services. User device 120 may include standard hardware computing components such as network and media interfaces, non-transitory computer-readable storage (memory), and processors for executing instructions that may be stored in memory.

User device 120A is illustrated as a mobile phone or smartphone, while user device 120B is illustrated as a tablet computing device and client device 120C is illustrated as a desktop device. As can be seen, each user device 120 is sized differently and/or has different input options. Exemplary embodiments of the present invention allow for tasks and applications that are specific to one user device 120 (e.g., desktop or laptop operating in a Microsoft Windows® environment) to be used and optimized for another user device 120 (e.g., touchscreen tablet operating in an Apple iOS® environment).

Each user device 120 may act as a host device interacting with a client device; likewise, each user device 120 may act as the client device in communication with a host. A user device 120 may further include a client application, a client 3D library, and a client display driver. Collectively, these elements may enable the user device and the user to consume computer graphics resources or services provided by server 130.

Server 130 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Server 130 may associated with the same user and located in the same local network as user device 120C. Alternatively, server 130 may be located remotely (e.g., in the cloud) and may be associated with a third party that provides services in accordance with embodiments of the present invention. In some instances, the services may be provided via software (e.g., software as a service) downloaded from server 130 to one or more user devices 120. Updated software may similarly be downloaded as the updates become available or as needed.

Server application may represent an application executing ("running") on server 130. The functionality of server application may be visible to and accessible by client 120 via application publishing over the cloud (e.g., communication network 110), such as that supported by GraphOn GO-Global, Microsoft Remote Desktop Services, and Citrix XenApp. Examples of server application may include a computer-aided design (CAD) application, such as AutoCAD® (by Autodesk, Inc. of San Rafael, Calif.) or Cadence Virtuoso (by Cadence Design Systems of San Jose, Calif.), a medical clinical workflow application such as Symbia.net (by Siemens AG of Munich, Germany), an interactive mapping application such as Google Earth (by Google, Inc of Mountain View, Calif.), or a 3D game.

Figure 2:
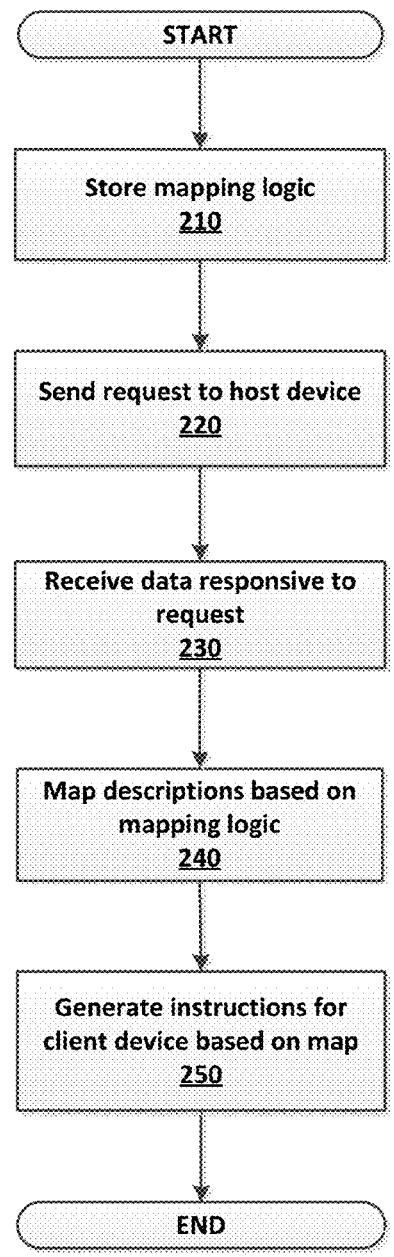
FIG. 2 is a flowchart illustrating an exemplary method of automatic mapping for cross-platform display.

FIG. 2 illustrates a method 200 for automatic mapping for cross-platform display. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 of FIG. 2, mapping logic information is stored in memory, a request is sent to host device, responsive data is received, descriptions in the responsive data are mapped to responses based on the stored mapping logic, and instructions for a a client device are generated based on the mapped descriptions. The display instructions are executable by a client device to initiate the response associated with the mapped description.

In step 210, mapping logic information is stored in memory. In various embodiments, the stored mapping logic may reside in memory at the host device, client device, or in an intermediary device (e.g., in the cloud). The mapping logic associates particular type of input data with a response specific to the client device 120A. For example, a status update on the client device 120A may be associated with a translucent pop-up window. Similarly, user selection of a particular menu on client device 120A may be associated with a scrolling list of menu options. The mapping logic may be automatic and/or developer-driven. Such logic may further be specific to the particular applications, hosts, clients, or host-client combinations.

In step 220, a request initiated at a requesting client device (e.g., user device 120A) is sent to a host device. The host device may be another user device 120 (e.g., user device 120C) and may host various types of data and resources, any of which may be subject of the request sent by the requesting client device 120A. For example, a mobile device 120A may request access to certain host data or may request that a task be performed by host device 120C (and/or host device applications).

In step 230, data responsive to the request is received. The responsive data includes information regarding a display of the host device 120C, which may have changed in response to the request sent in step 220. For example, where the client device 120A requests access to a document hosted on host device 120C, the host device display may include a window presenting at least a portion of the requested document. Similarly, where the mobile device 120A requests that host device 120C perform a task (e.g., launch an application), the display may include a window presenting a user interface associated with the application. In some embodiments, the data may include descriptions of the host device display, which may include XML-based (extensible markup language) descriptions. This data may come primarily from a tool that can be used prior to publishing an application for remote access. This tool may utilize a combination of data sources including but not limited to application resources, window class, and tree view tagging. Application resources may include menus and dialogs within the application resources that would be used to identify relevant information. With respect to window class a running application may have certain window types that can be identified via the "Window Class". Tree view tagging tool may provide a tree view of the window hierarchy of an application in which certain portions of the application can be tagged as to how they should be presented on the various devices such as the main content area, toolbar area(s), etc.

Figure 3A:
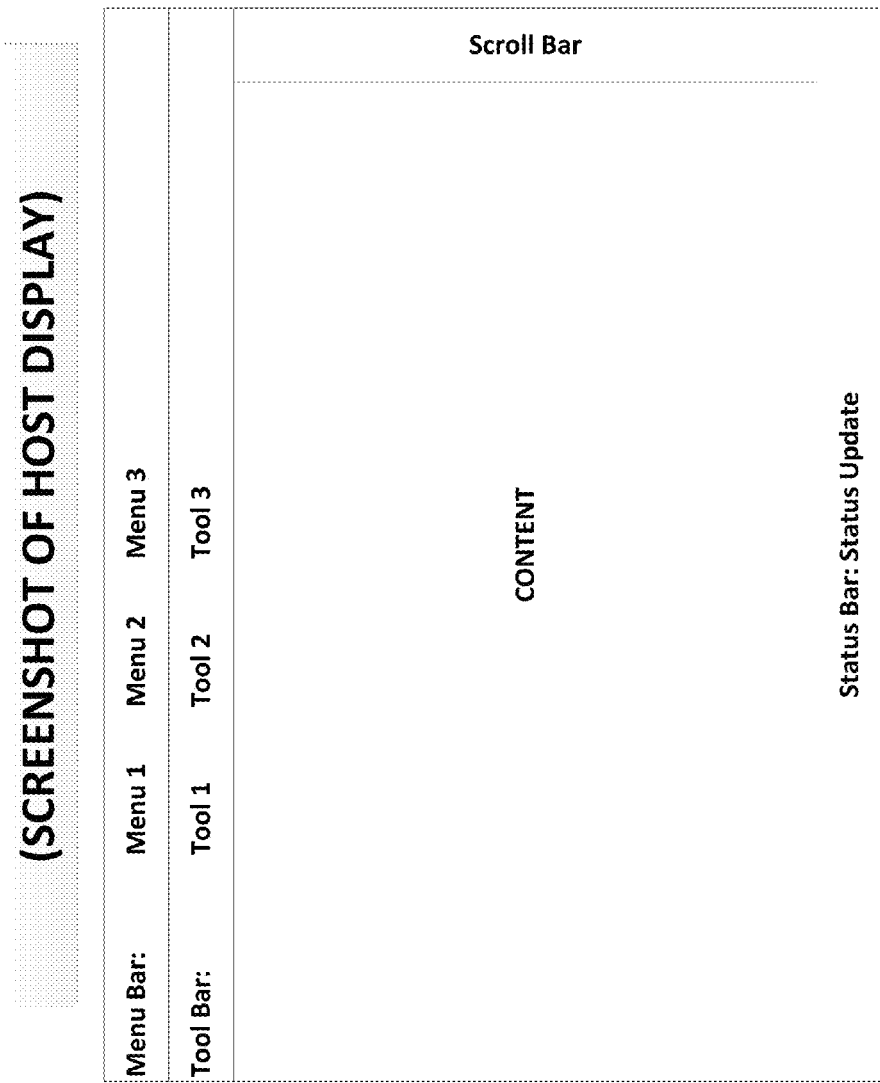
FIG. 3A is a screenshot of an exemplary display of a host device.

In step 240, the descriptions of the display of the host device 120C are mapped to particular responses based on the stored mapping logic. FIG. 3A illustrates a screenshot of an exemplary display of a host device. Depending on the application(s) currently running on host device 120C, there may be any number of content or interface portions that may be present in the display. The responsive data received in step 230 may include information indicating how many portions and what kind are currently associated with the display of host device 120C. As illustrated, FIG. 3A illustrates a content portion, as well as a menu bar, a tool bar, a status bar, and a scroll bar. In addition, certain bars in FIG. 3A, as well as its associated tools may be associated with particular commands or instructions. The data received in step 230 (e.g., XML-based descriptions) may indicate or otherwise be used to determine which commands or instructions are associated with each portion (and/or sub-portion) by the host device 120C. In this step, the descriptions may be further mapped to particular commands or instructions to be executed at client device 120A.

Figure 3B:
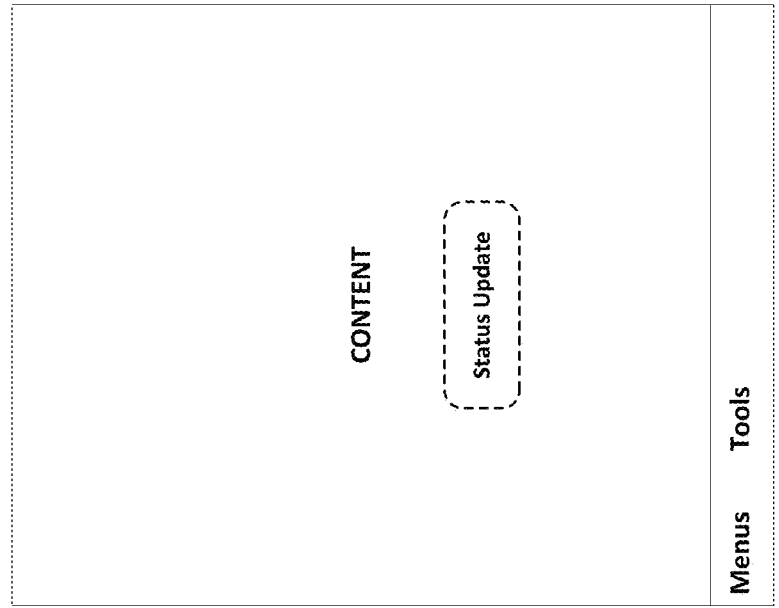
FIG. 3B is a screenshot of a display of a client device that is based on instructions generated in accordance with an exemplary method of automatic mapping for cross-platform display.

While some commands or instructions may be similar to that of host device 120C, some may be specific to client device 120A. For example, a status bar in a host device display may be used to reflect status updates, while status updates are displayed as translucent pop-up windows in the client device display. FIG. 3B illustrates a client device display generally corresponding to the host device display of FIG. 3A. As can be seen in FIG. 3B, the status update does not appear in any status bar, but rather in a translucent pop-up window. In addition, the menu bar and tool bar of the host device display have been reconfigured into a single bar on the client device display.

In step 250, instructions regarding the display of the client device 120A are generated and provided to client device 120A for execution. The instructions provide for a client device display and responses from the client device 120A based on the mapping performed in step 240.

Various embodiments of the present invention allow for the method 200 to be performed by an intermediary device (e.g., server 130) which may be associated with the host device or reside elsewhere in the network (e.g., in the cloud). For example, server 130 may store the mapping logic, receive a request from a requesting client device 120A, forward to a host client device 120C, receive responsive data from host client device 120C, map the host device display descriptions to responses by client device 120A based on the stored mapping logic, and generate the instructions for the client device 120A display based on the map, which may then be sent to client device 120A. Upon execution, the client device display may correspond to a display on the host device 120C, but the client device 120A may respond to certain descriptions in a manner specific to the client device 120A (e.g., displaying translucent pop-up windows for status updates rather than in a dedicated status bar).

Alternatively, the method 200 may be performed by software downloaded to a user device 120. For example, software located at either requesting client device 120A or host device 120C may provide a request initiated at the requesting client device 120A to host client device 120C, receive data responsive to the request as provided by host client device 120C, map descriptions of the host device display to a response at client device 120A, and generate the instructions for client device 120A display based on the map, which may then be sent or otherwise provided to client device 120A for execution. The result may include a client device display that may correspond to a display on the host device 120C, while allowing the client device 120A to respond to certain descriptions in a manner specific to the client device 120A.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for automatic mapping of cross-platform display, the method comprising:
   storing mapping logic information in memory, wherein the mapping logic information associates a type of input information with a type of response specific to an operating system of a client device;
   sending a request over a communication network to a host device having a different operating system than the operating system of the client device, the request concerning information regarding a display of the host device;
   receiving a plurality of descriptions of the host device display over the communication network from the host device;
   executing instructions stored in memory, wherein execution of instructions by a processor:
      maps each of the plurality of descriptions of the host device display to a response at the client device, wherein the mapping is based on the stored mapping logic information, and wherein the plurality of descriptions includes a description of a user interface portion of the host device, the description of the user interface portion including a command associated with the user interface portion of the host device display and determined based on an extensible markup language (XML)-based description, and
      generates instructions for the client device based on the mapped descriptions, wherein receipt of information corresponding to one of the descriptions initiates the associated response in accordance with the mapped description; and
   transmitting the generated instructions over the communications network to the client device for execution, wherein a display is generated on the client device based on the generated instructions, wherein at least one user interface portion in the generated client device display appearing different from a corresponding user interface portion in the host device display.

2. The method of claim 1, wherein the request pertains to performance of a task by the host device.

3. The method of claim 2, wherein the performance of the task results in a change to the host device display.

4. The method of claim 1, wherein the mapping logic associates a first type of interface portion of the host device with a different type of interface portion of the client device.

5. An apparatus for automatic mapping of cross-platform display, the method comprising:
   memory for storing mapping logic information, wherein the mapping logic information associates a type of input information with a type of response specific to an operating system of a client device;
   a server for:
      sending a request over a communication network to a host device having a different operating system than the operating system of the client device, the request concerning information regarding a display of the host device, and
      receiving a plurality of descriptions of the host device display over the communication network from the host device;
   a processor for executing instructions stored in memory, wherein execution of instructions by a processor:
      maps each of a plurality of descriptions of the host device display to a response at the client device, wherein the mapping is based on the stored mapping logic information, and wherein the plurality of descriptions includes a description of a user interface portion of the host device, the description of the user interface portion including a command associated with the user interface portion of the host device display and determined based on an extensible markup language (XML)-based description, and
      generates instructions for the client device based on the mapped descriptions, wherein receipt of information corresponding to one of the descriptions initiates the associated response in accordance with the mapped description;
   wherein the server transmits the generated instructions over the communications network to the client device for execution, wherein a display is generated on the client device based on the generated instructions, wherein at least one user interface portion in the generated client device display appearing different from a corresponding user interface portion in the host device display.

6. The apparatus of claim 5, wherein the request pertains to performance of a task by the host device.

7. The apparatus of claim 6, wherein the processor executes instructions to perform the task, wherein the performance of the task results in a change to the host device display.

8. The apparatus of claim 5, wherein the mapping logic associates a first type of interface portion of the host device with a different type of interface portion of the client device.

9. A non-transitory computer-readable storage medium, having embodied thereon a program executable by a processor to perform a method for automatic mapping of cross-platform display, the method comprising:
   storing mapping logic information, wherein the mapping logic information associates a type of input information with a type of response specific to an operating system of a client device;
   sending a request to a host device, the request concerning information regarding a display of the host device having a different operating system than the operating system of the client device;
   receiving a plurality of descriptions of the host device display from the host device;
   mapping each of the plurality of descriptions of the host device display to a response at the client device, wherein the mapping is based on the stored mapping logic information, and wherein the plurality of descriptions includes a description of a user interface portion of the host device, the description of the user interface portion including a command associated with the user interface portion of the host device display and determined based on an extensible markup language (XML)-based description;
   generating instructions for the client device based on the mapped descriptions, wherein receipt of information corresponding to one of the descriptions initiates the associated response in accordance with the mapped description; and
   transmitting the generated instructions over the communications network to the client device for execution, wherein a display is generated on the client device based on the generated instructions, wherein at least one user interface portion in the generated client device display appearing different from a corresponding user interface portion in the host device display.

* * * * *